United States Patent [19]

Inaba

[11] 4,347,578
[45] Aug. 31, 1982

[54] INDUSTRIAL ROBOT CONTROL SYSTEM
[75] Inventor: Hajimu Inaba, Hino, Japan
[73] Assignee: Fujitsu Fanuc Limited, Tokyo, Japan
[21] Appl. No.: 29,851
[22] Filed: Apr. 13, 1979
[30] Foreign Application Priority Data
Apr. 26, 1978 [JP] Japan .............................. 53-049413
[51] Int. Cl.³ ...................... G06F 15/46; G05B 19/42
[52] U.S. Cl. ................................... 364/513; 318/568;
364/474; 364/478; 414/730
[58] Field of Search ............... 364/513, 478, 474, 120;
318/568; 414/4, 5, 225, 226, 589, 590, 744, 749,
750, 730, 909

[56] References Cited
U.S. PATENT DOCUMENTS

| Re. 30,016 | 5/1979 | Hohn | 364/513 X |
| 4,021,651 | 5/1977 | Mitsusashi et al. | 364/513 |
| 4,025,838 | 5/1977 | Watanabe | 318/568 |
| 4,130,873 | 12/1978 | Fioretta et al. | 364/513 |
| 4,140,953 | 2/1979 | Dunne | 318/568 |
| 4,178,632 | 12/1979 | Anthony | 364/513 |

Primary Examiner—Joseph F. Ruggiero
Attorney, Agent, or Firm—Staas & Halsey

[57] ABSTRACT

Teach data for directing the operation of an industrial robot is entered from a teach operating panel and set in a teaching memory. Machine work identify, insufficient machine work detect and other similar external data and data, such as the current and teach positions of the robot, are set in a work memory. A processor accomplishes write/read control of the teaching memory and the work memory and processing of the various data. In accordance with the result of processing by the processor, the robot is controlled and, in accordance with the contents of the external data, the teach data or the sequence by which the teach data controls is modified, thereby to efficiently operate the robot.

21 Claims, 3 Drawing Figures

FIG. 3

| | TDM |
|---|---|
| 00 | F (O) |
| | Z (Zi) |
| | θ (θi) |
| | R (Ri) |
| | S (S58(10)) |
| 01 | F (O) |
| | Z (Zi) |
| | θ (θi) |
| | R (Ri) |
| | S (S51(7)(5)(10)) |

INDUSTRIAL ROBOT CONTROL SYSTEM

BACKGROUND OF THE INVENTION

1. Field of the Invention

This invention relates to an industrial robot control system, and more particularly to a control system for operating an industrial robot in response to external information.

2. Description of the Prior Art

An industrial robot has come into use for tool exchange of a machine tool or workpiece exchange. Such an industrial robot heretofore employed generally performs a certain sequence of operations in response to a predetermined program. In the case of achieving various kinds of working by the machine tool and with the industrial robot operating only in a constant sequence, the waiting time is likely to increase. To shorten the waiting time in the above case, a complicated program is required. Accordingly, the prior art industrial robot is normally employed only in the case of repeating operations in the same order.

SUMMARY OF THE INVENTION

An object of this invention is to provide an industrial robot control system in which an industrial robot is actuated in accordance with teach data and the sequence of the teach data is modified in response to machine work identify, tool damage detect or like external information, thereby to make effective use of the industrial robot.

Briefly stated, the industrial robot control system of this invention has a teaching memory means for setting teach data, a work memory means for setting external data, data of the current and teach positions of an industrial robot, etc. and a processor for achieving write-/read control of the teaching memory and the work memory and arithmetic operation. The processor controls the robot in accordance with the contents of the teaching memory means and modifies the teach data or the sequence of the teach data in response to the contents of the work memory means having the external and robot positioning data.

Other objects, features and advantages of this invention will become more apparent from the following description taken in conjunction with the accompanying drawings.

BRIEF DESCRIPTION OF THE DRAWINGS

FIG. 3 is explanatory of the address areas of a teaching memory means employed in this invention.

DESCRIPTION OF THE PREFERRED EMBODIMENTS

Figure 1:
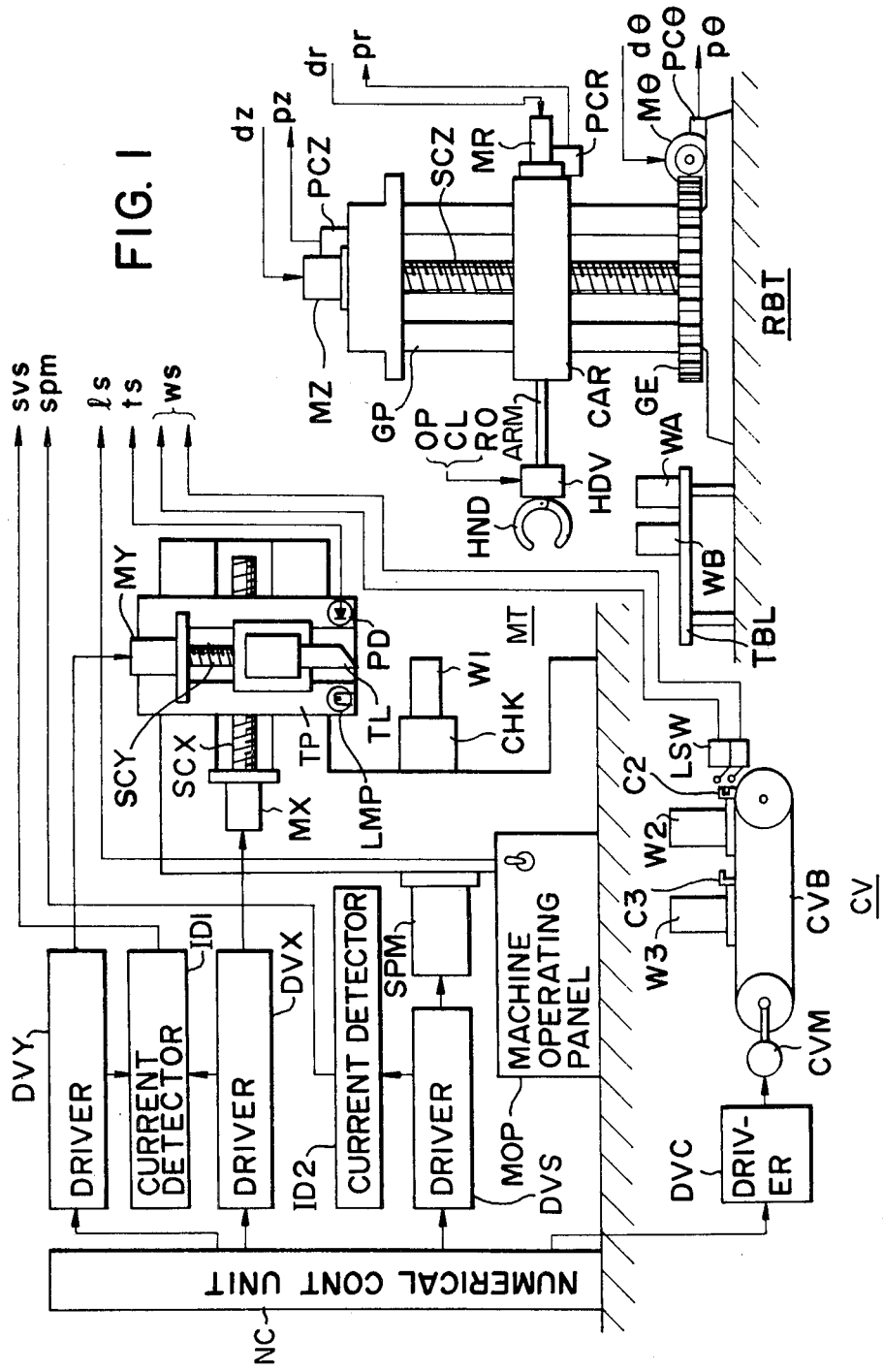
FIG. 1 is explanatory of a machine tool and a robot for use with the robot control system in accordance with the invention.

FIG. 1 is explanatory of an industrial robot and a machine tool used with the robot control system in accordance with the invention. The robot generally designated by RBT has a gear GE driven by a motor $M\theta$, guide poles GP rotating together with the gear GE, a carriage CAR guided by the guide poles GP, a screw SCZ for moving up and down the carriage CAR, a motor MZ for driving the screw SCZ, an arm ARM horizontally moved by a motor MR mounted on the carriage CAR and a hand HND opened and closed and rotated by a drive unit HDV mounted on the top of the arm ARM. The motors $M\theta$, MZ and MR are respectively driven by drive signals $d\theta$, dz and dr. From pulse coders $PC\theta$, PCZ and PCR respectively coupled with the motors $M\theta$, MZ and MR are derived signals $p\theta$, pz and pr indicating the rotational positions of the motors $M\theta$, MZ and MR, respectively.

The machine tool generally designated by MT has a chuck CHK for holding a workpiece W1, a tool post TP for mounting a tool TL, feed screws SCX and SCY for feeding the tool post in the X and Y directions, motors MX and MY for driving the feed screws SCX and SCY, a spindle motor SPM for revolving the chuck CHK, a lamp LMP and a photo detector PD for detecting damage of the tool TL, and a machine operating panel MOP.

Workpieces W2 and W3 carried by a conveyor belt CVB of a conveyor means CV are placed on a pallet provided with code plates C2 and C3 indicating the kind of machine work to be done to the workpieces and, for reading the code plates C2 and C3, a limit switch LSW is provided. The conveyor belt CVB is driven by a motor CVM. Workpieces WA and WB, after being machine-worked, are placed by the robot RBT on a table TBL.

Reference characters DVX, DVY, DVS and DVC indicate drive circuits for the motors MX, MY, SPM and CVM, respectively; ID1 and ID2 designate current detectors for identifying abnormalities by detecting load currents of the motors MX, MY and SPM; NC identifies a numerical control unit for controlling the machine tool MT and conveyor CV; ws denotes machine work identify signals from limit switch LSW; ts represents a tool damage signal; ls designates an insufficient machine work signal derived from the machine operating panel MOP; spm refers to a spindle motor abnormality signal from detector ID2; svs indicates a machine servo motor abnormality signal from detector ID1; and OP, CL and RO designate robot hand (HND) opening, closing and rotating command signals.

The hand HND of the robot RBT accomplishes exchange of the tool TL and mounting and dismounting of a workpiece on and from the chuck CHK. For example, in the case of dismounting the workpiece W1 from the chuck CHK and mounting the next workpiece W2 from the conveyor belt CVB to the chuck CHK, the limit switch LSW reads the machine work identify signal ws corresponding to the code plate C2 which indicates the kind of machine work to be done on the workpiece W2. For identifying the kind of machine work, other desired read means can be employed. Since the control by the numerical control unit NC can be achieved in a known manner, no detailed description will be given herein.

Figure 2:
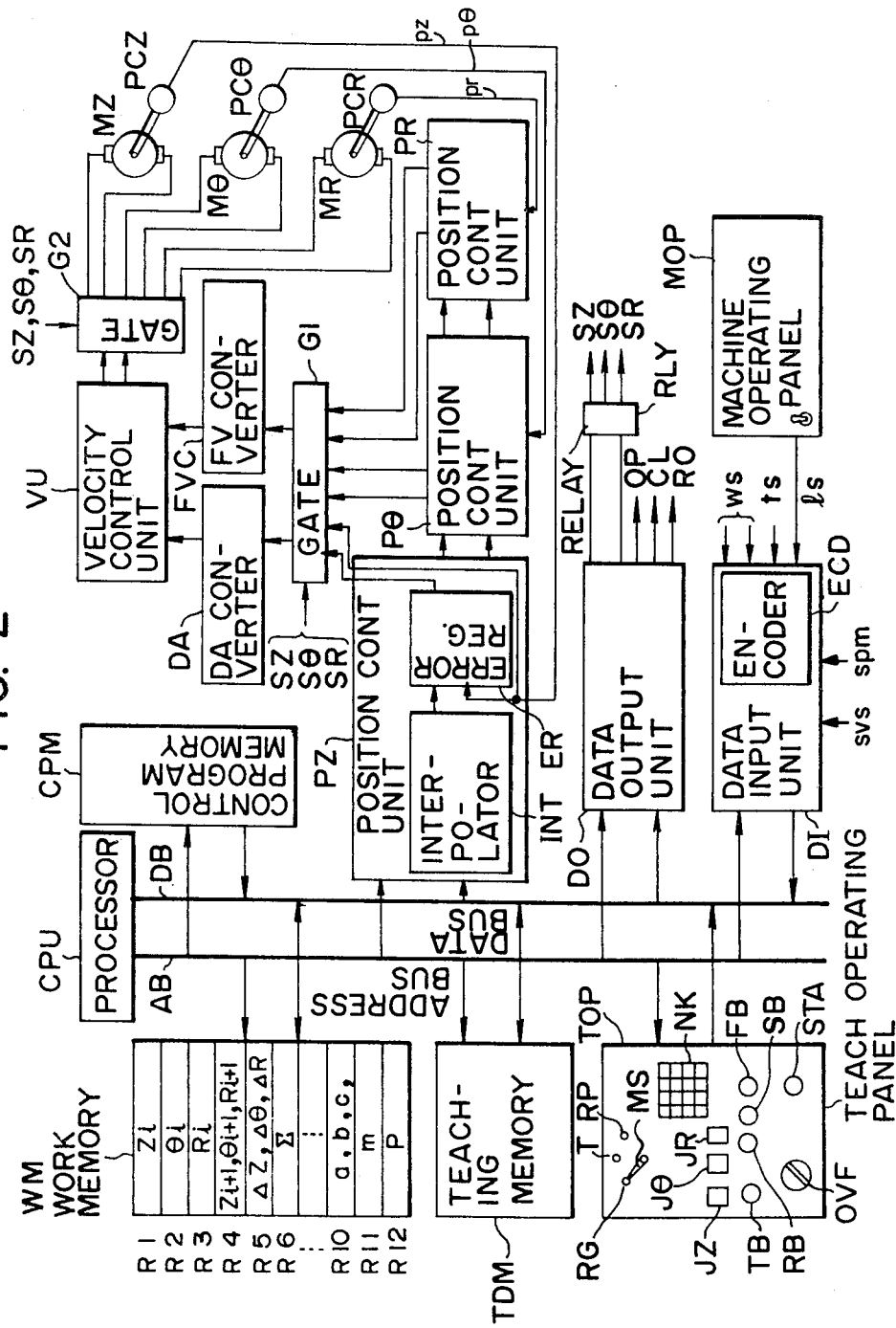
FIG. 2 is a block diagram illustrating an embodiment of the robot control system in accordance with this invention.

FIG. 2 illustrates in block form an embodiment of the robot control system of this invention. Reference characters MZ, $M\theta$, MR and PCZ, $PC\theta$, PCR again designate the motors and the pulse coders of the robot RBT depicted in FIG. 1; MOP again designates the machine operating panel; CPU identifies a processor; AB denotes an address bus; DB represents a data bus; WM shows a work memory; CPM refers to a control program memory; TDM indicates a teaching memory; TOP designates a teach operating panel; PZ, $P\theta$ and PR identify position control units; DO denotes a data output unit; DI represents a data input unit; ECD shows an encoder; INT refers to an interpolator; ER indicates an error register; G1 and G2 identify gate circuits; DA denotes a D-A converter; FVC represents a velocity-to-voltage converter; VU shows a velocity control unit; and RLY refers to relays for outputting robot axis select signals SZ, Sθ and SR.

The work memory WM sets current positions $Z_i$, $\theta_i$ and $R_i$ of the robot in its register areas R1 through R3, teach positions $Z_{i+1}$, $\theta_{i+1}$ and $R_{i+1}$ of the robot in a register area R4, the results of arithmetic operation of the amount of movement of the robot, $\Delta Z$, $\Delta\theta$ and $\Delta R$, in a register area R5, the result of addition of data for controlling the robot, $\Sigma$, in a register area R6, external data, such as machine work identify data a, b and c, in a register area R10, the number of remaining machine works m in a register area R11 and the number of insufficient machine works P in a register area R12.

A description will be made of a teaching procedure for the control system on the assumption that the hand HND of the robot RBT lies in the origin. The teaching procedure starts with putting a mode switch MS of the teach operating panel TOP in a teach mode T, entering 0 from a numerical key board NK and depressing a feed speed teach button FB. As a consequence, 0 is written in an area F of an address 00 in the teaching memory TDM under the control of the processor CPU. The teaching memory TDM has areas F, Z, θ, R and S for each address, as shown in FIG. 3.

Next, a robot axis data teach button TB is depressed, by which the current positions $Z_i$, $\theta_i$ and $R_i$ of the robot hand HND are transferred from the register areas R1 to R3 of the work memory WM to the areas Z, θ and R of the address 00 in the teaching memory TDM.

After this, a code S58 (10) is entered as explained in detail hereinafter. That is, the number 58 is entered from the numerical keyboard NK; a push button SB is depressed; the number 10 is entered from the numerical keyboard NK; and the push button SB is depressed. As a result of this, S58 (10) is written in the area S of the address 00 of the teaching memory TDM.

Following this, the feed speed teach button FB is depressed, by which a numerical value 0 is written in the area F of an address 01 and then the robot axis data teach button TB is depressed, by which the current positions $Z_i$, $\theta_i$ and $R_i$ of the hand HND are written in the areas Z, θ and R of the address 01. Next, a code S51(7) (5) (10) is entered. That is, the numbers 51, 7, 5 and 10 are each entered from the numerical keyboard NK and by depressing the push button SB, by which S51(7) (5) (10) is written in the area S of the address 01 of the teaching memory TDM.

Examples of the code S now will be described. S00 indicates the completion of the code S. S09 indicates the completion of a workpiece lot, i.e. the completion of the operation of the robot 1, and the robot does not operate further unless the program is restored to its start. S11 indicates full opening of the fingers of the robot hand and S12 the closing of the fingers of the robot hand. S25(T) indicates a timer for dwelling time specified by T, S37 the start of the operation of the machine tool, S50(A) branching to an address A, and S51(N) (A) (R) an operation proceeding to the address A when the content of the register area R is a number N. S52(N) (R) indicates an increase or decrease in the content of the register area R by a number N, S53(N) (R) setting a number N in the register area R and S99 the completion of the program.

In the case of writing machine workpiece handling teach data in the teaching memory TDM from the teach operating panel TOP, manual feed buttons JZ, Jθ and JR are successively depressed to shift the robot hand HND to a predetermined teach position and the robot hand feed speed is entered from the numerical keyboard NK and then the feed speed teach button FB is depressed, by which the feed speed is written in the area F of an address 06. Further, by depressing the robot axis data teach button TB, the current positions of the hand HND shifted by the manual feed are written in the areas Z, θ and R of the address 06. In the case of requiring auxiliary operations, such as opening, closing, and rotation of the hand HND, the code S is further entered. Next, the manual feed buttons JZ, Jθ and JR are successively depressed to write teach data in the areas Z, θ and R of an address 07, as is the case with the above.

In this manner, the teach data for defining the operation of the robot RBT is written in the teaching memory TDM. Following this, the mode switch MS is set in a register storing mode RG, the number 11 indicating a register area R11 of the work memory WM is entered from the numerical keyboard NK, a register setting button RB is depressed, the number of workpieces to be machined is entered from the numerical keyboard NK, and again the register setting button RB is depressed, by which the number m is set as an initial value in the register area R11.

Assuming, for example, that the contents of the teaching memory TDM are such as shown in Table 1, the operation of the robot RBT is started by setting the mode switch MS in a repeat operation mode RP and pressing a start button STA. By pressing the start button STA, the contents of the teaching memory TDM are successively read by a processor CPU. The first reading of the TDM memory is the content of the address 00.

TABLE 1

| Address | S code | Contents |
|---|---|---|
| 00 | S58(10) | Write external data in register area R10. |
| 01 | S51(7) (5) (10) | If content of R10 is 7, branch to 05. |
| 02 | S51(0) (6) (10) | If content of R10 is 0, branch to 06. |
| 03 | S51(1) (16) (10) | If content of R10 is 1, branch to 16. |
| 04 | S51(2) (26) (10) | If content of R10 is 2, branch to 26. |
| 05 | S09, S99 | Lots ends, program ends. |
| . | | |
| . | | |
| . | | |
| 06 | | Workpiece a mounting and dismounting program P1. |
| 15 | S50(36) | Branch to address 36. |
| 16 | | Workpiece b mounting and dismounting program P2. |
| . | | |
| . | | |
| 25 | S50(36) | Branch to address 36. |
| 26 | | Workpiece c mounting and dismounting program P3. |
| . | | |
| . | | |
| 35 | S50(36) | Branch to address 36. |
| 36 | S58(10) | Write external data in register area R10. |
| 37 | S51(6) (39) (10) | If content of R10 is 6, branch to 39. |
| 38 | S52(−1) (11) | Subtract 1 from content of R11. |
| | S50(40) | Branch to address 40. |
| 39 | S52(+1) (12) | Add 1 to content of R12. |
| 40 | S51(0) (42) (11) | If content of R11 is 0, branch to 42. |
| 41 | S37, S99 | Machine work start Command, program ends. |
| 42 | S09, S37, S99 | Lot ends, machine work Start |

| TABLE 1-continued | | |
|---|---|---|
| Address | S code | Contents |
| | | command, program ends. |

The area F of the address 00 indicates 0 and the areas Z, θ and R of the address 00 are the initial positions of the robot RBT. Since in the example the hand HND of the robot RBT lies at the position of its origin, the robot does not operate but instead the external data are written into the work memory WM. The external data (signals ws, ts, ls, svs, spm) are entered via the data input unit DI. The machine work identify data (signals ws) designated as a to c, and the insufficient machine work data and the tool damage or like abnormality data are encoded by the encoder ECD with the numbers 0 through 2, 6 and 7, respectively, and then entered. The entered contents of the external data written in the work memory WM are set in the register area R10.

Next, the content of the TDM address 01 is read to execute the operation of the code S alone. When the program steps to the address 01, if the content of the register area R10 is 7, it indicates the occurrence of an abnormality, so that the program jumps to the address 05, where the lot ends, that is, the program ends. If no abnormality occurs, the program steps to the next address 02 and if the content of the register area R10 is 0 indicating that the machine work data is a, the program jumps to the address 06. If the machine work data is not a, the program steps to the next address 03. At this address 03 and the next address 04, a similar operation takes place.

At the addresses 06 through 14 the workpiece a mounting and dismounting program P1 is executed. As for the Z-axis position of the robot RBT, the following arithmetic operation is accomplished using the current robot position $Z_i$, the teach position $Z_{i+1}$ and the teach feed speed F:

$$(Z_{i+1} - Z_i) \times F/n = \Delta Z \quad (1)$$

$\Delta Z$ is provided to the position control unit PZ with a constant period. Upon each occurrence of $\Delta Z$, an arithmetic operation, $Z_i + \Delta Z$, is achieved and the operation result is set in the register area R6 of the work memory WM. The arithmetic operation is repeated until the content $\Sigma$ of the register area R6 becomes equal to the teach position $Z_{i+1}$.

In the position control unit PZ, $\Delta Z$ is written in the interpolator INT with a constant period. The interpolator INT has one reference pulse train generator and a preset counter and, in the constant period, converts $\Delta Z$ to a pulse train for input to the error register ER. A pulse PZ from the pulse coder PCZ is fed back to the error register ER to subtract its content. The content of the error register ER is provided via the gate circuit G1 to the D-A converter DA for conversion into an analog voltage. The feedback pulse is also applied via the gate circuit G1 to the feed-speed-to-voltage converter FVC for conversion into a voltage. The velocity control unit VU achieves thyristor firing control by an error voltage that the content of the error register ER has been converted to the analog voltage and by the output voltage from the converter FVC, and drives the motor MZ via the gate circuit G2. As a consequence, the carriage CAR is moved to the teach position $Z_{i+1}$.

The motors Mθ and MR for further positioning of the robot hand HND are also controlled in the same manner as described above. For the axis switching, axis data is applied to the data output unit DO and, by the relay RLY, the axis select signals SZ, Sθ and SR are generated for input to the gate circuits G1 and G2, by which the axis switching control is conducted in response to the axis select signals. When the hand-finger opening signal OP, the hand-finger closing signal CL and the hand rotating signal RO are provided by the code S, these signals are applied from the data output unit DO to the operating unit HDV of the hand HND.

When such a program P1 as described above has been executed to reach the address 15, the program is branched to the address 36, where the external data is written into the work memory WM at register R10. If no insufficient machine work (code 6) is read as a result of execution of the content of the address 37, the content of the address 38 is executed to subtract one from the content of the register area R11 of the work memory WM. This is followed by the execution of the content of the address 40 and, if the number of remaining work pieces to be machined is not zero, the content of the address 41 is executed to issue a machine work start command, thus starting control of the machine tool by the numerical control unit NC.

Upon occurrence of insufficient machine work, the insufficient machine work signal ls is applied from the machine operating panel MOP to the data input unit DI and, during execution of TDM address 36, the external data readout code, 6 is set in the register area R10 of the work memory WM. By the execution of the content of the address 37 of the teaching memory TDM, code 6 is read and the program is branched to the address 39 to add 1 to the content of the register area R12 of the work memory WM. In this case, the number of workpieces to be machined is not subtracted, so that the control is repeated until the number of required pieces is reduced to zero, thereby ensuring that the predetermined number (m) of workpieces are sufficiently machined.

As has been described in the foregoing, according to this invention teach data are entered in the teaching memory TDM from the teach operating panel TOP and external data, such as the current and teach positions $Z_i$, $\theta_i$, $R_i$ and $Z_{i+1}$, $\theta_{i+1}$, $R_{i+1}$ of the robot RBT, machine work identify data and abnormality data, are set in the work memory WM. Under the control of the processor CPU, the contents of the teaching memory TDM and work memory WM are read and, if necessary, an arithmetic operation is accomplished and, in response to the contents of the teaching memory TDM, the robot is controlled. Further, by reading in the external data, teach data is modified or the sequence by which the teach data controls is modified. Control in response to the machine work being selected and control in the case of an abnormality occurring can easily be accomplished. Accordingly, even where there are many different kinds of machine works being effected, control corresponding to each kind of machine work can be achieved. Further, the kind of machine work can easily be read by attaching a code plate or the like to the pallet carrying workpieces, as in the foregoing embodiment.

It will be apparent that many modifications and variations may be effected without departing from the scope or novel concepts of this invention.

What is claimed is:

1. An industrial robot control system comprising:
   (a) teach operating panel means for entering teach data;
   (b) teaching memory means for setting teach data entered from the teach operating panel means in a program having specified codes for automatically modifying the set teach data or sequence of the programmed teach data in accordance with additional data corresponding to the specified program codes for directing the operation of the robot;

(c) means for entering and coding additional external data and data of the current position of the robot;

(d) work memory means for setting the coded external data and the data of the current and teach position of the robot; and (e) processor means for write/read control of the contents of the teaching memory and work memory means and performing an arithemtic operation, wherein the processor controls the operation of the robot by processing the coded program of the teach data memory means to read the entered teach data and to modify the teach data or the sequence of the programmed teach data in accordance with the coded data read from the work memory means.

2. An industrial robot control system according to claim 1, wherein the external data includes machine work identify, insufficient machine work and abnormality detect information.

3. An industrial robot control system according to claim 1, wherein the teach position data of the robot is obtained by entering into the teach operating panel means data of a manually-selected position of the robot.

4. The system of claim 2 wherein said means for entering the external data includes means for identifying machine work, means for detecting abnormalities and means for generating input signals corresponding to the identified machine work and detected abnormalities.

5. The system of claim 4 wherein the control system is connected to a machine tool exchange and workpiece exchange wherein a motor-driven machine has a tool operating on a workpiece and wherein the means for detecting abnormalities includes means for detecting tool damage and current abnormalities in the machine motor and generating signals in response thereto.

6. The system of claim 5 wherein said means for entering the external data further includes a machine operating panel means for generating an input signal indicating insufficient machine work.

7. The system of claim 6 wherein the means for entering external data further includes a data input encoder having an input connected to the output of the machine operating panel and the signal generating means for detecting motor current and tool abnormalities and machine work and an output connected to the processor means.

8. The system of claim 5 wherein said machine motor current detecting means generates signals in response to machine spindle-motor abnormalities and machine tool servo-motor abnormalities.

9. The system of claim 1 or 8 wherein the robot has drive motors for regulating the position of the robot and wherein the system further comprises position control means having an input from the processor means and an output to the robot drive motors for regulating the robot to its teach position in response to the signals received from the processor means.

10. The system of claim 9 wherein the robot has a hand with open, closed and rotatable positions and a motor for operating the robot hand and wherein the system further comprises data output means having an input from the processor means and an output to said robot hand motor for operating the robot hand in response to signals received from the processor means.

11. The system of claim 10 wherein said data output means has an output to the drive motor for the robot for further axial positioning of the robot in response to signals received from the processor means.

12. The system of claim 4 wherein data of preselected numbers of workpieces to be machined can be entered by the teach operating panel means.

13. The system of claim 5 wherein the workpiece exchange includes conveyor means on which are positioned workpieces and a code is associated with each workpiece positioned on the conveyor means, and wherein machine work detecting means detects the codes associated with the workpieces positioned on the conveyor means for generating machine work signals.

14. An industrial robot control system comprising:

(a) teach operating panel means for entering teach data;

(b) teach memory means for setting teach data entered by the teach operating panel means in a program having specified codes for automatically modifying the set teach data or sequence of the programmed teach data in accordance with additional data corresponding to the specified program codes for directing the operation of the robot;

(c) means for entering and coding additional external data relating to machine work identity, insufficient machine work and abnormality detect information and data of the current position of the robot, said external data entering means comprising means for identifying machine work, means for detecting abnormalities, means for generating input signals corresponding to the identified machine work and detected abnormalities, machine operating panel means for generating an input signal indicating insufficient machine work, and a data input encoder having an input connected to the output of the machine operating panel and the signal generating means for identified machine work and detected abnormalities;

(d) work memory means for setting the coded external data and the data of the current and teach position of the robot;

(e) processor means for write/read control of the contents of the teaching memory and work memory means and performing an arithmetic operation, wherein the processor provides control signals for the operation of the robot by processing the coded program of the teach data memory means to read the entered teach data and to modify the teach data or the sequence of the programmed teach data in accordance with the coded data read from the work memory means;

(f) position control means having an input from the processor means and an output to the robot for regulating the robot to its teach position in response to the signals received from the processor means; and (g) data output means having an input from the processor means and output to a motor for driving a hand of the robot to open, closed and rotatable positions in response to signals received from the processor means and wherein the data output means has output to a drive motor for the robot for further axial positioning of the robot in response to signals received from the processor means.

15. The system of claim 14 wherein the control system is connected to a machine tool exchange and workpiece exchange wherein a motor-driven machine has a tool operating on a workpiece and wherein the means for detecting abnormalities includes means for detecting tool damage and current abnormalities in the machine motor and generating signals in response thereto.

16. The system of claim 14 wherein data of preselected numbers of workpieces to be machined can be entered by the teach operating panel means.

17. The system of claim 15 wherein the workpiece exchange includes conveyor means on which are positioned workpieces and a code is associated with each workpiece positioned on the conveyor means, and wherein machine work detecting means detects the codes associated with the workpieces positioned on the conveyor means for generating machine work signals.

18. The system of claim 14 wherein the teach position data of the robot is obtained by entering into the teach operating panel means data of a manually-selected position of the robot.

19. A method for controlling an industrial robot in a machine tool and workpiece exchange system comprising the steps of:
    (a) entering and storing teach data for operation of the robot in teach memory means in a program having specified codes for automatically modifying the stored teach data or sequence of the programmed teach data in accordance with data corresponding to the program codes read from work memory means;
    (b) entering and coding data of the current position of the robot and external data relating to machine work identity, insufficient machine work, and abnormality detection in data entry and coding means;
    (c) storing the coded data of the current position of the robot and coded external data in the work memory means;
    (d) processing by processor means the coded program from the teach memory means to read the teach data and modify the teach data or sequence of the programmed teach data in accordance with coded data read from the work memory means; and
    (e) automatically controlling the operation of the robot in accordance with the processed teach and external data program.

20. The method of claim 19, further comprising the steps of detecting abnormalities in the tool of the machine tool exchange and in the machine motor of the workpiece exchange by detecting means and generating signals in response to the detected abnormalities, and wherein step (b) comprises automatically entering the abnormality signals into the data entry and coding means.

21. The method of claim 19 or 20, further comprising the step of detecting machine work for a workpiece by detecting means sensing codes associated with the workpiece and generating a signal in response to the second code and wherein step (b) comprises automatically entering the machine work signal into the data entry and coding means.

* * * * *

UNITED STATES PATENT AND TRADEMARK OFFICE
CERTIFICATE OF CORRECTION

PATENT NO. : 4,347,578
DATED : August 31, 1982
INVENTOR(S) : Hajimu Inaba

It is certified that error appears in the above-identified patent and that said Letters Patent is hereby corrected as shown below:

Column 2, line 36, "signal:" should read -- signal from photo detector PD; --.

Column 3, line 56, "robot 1" should read -- robot --.

Column 5, line 17, "enterted" should read -- entered --.

Column 6, line 28, after "code" delete ",".

Column 7, line 13, "arithemtic" should read -- arithmetic --.

Column 10, line 28, "second" should read -- sensed --.

Signed and Sealed this

First Day of February 1983

[SEAL]

Attest:

GERALD J. MOSSINGHOFF

Attesting Officer     Commissioner of Patents and Trademarks